(12) United States Patent
Rieschick et al.

(10) Patent No.: US 8,726,376 B2
(45) Date of Patent: May 13, 2014

(54) METHODS, SYSTEMS AND DEVICES FOR THE DETECTION AND PREVENTION OF MALWARE WITHIN A NETWORK

(75) Inventors: Gary Rieschick, Louisburg, KS (US); Cameron Ross Dunne, Newbridge (IE); Alan McNamee, Drumcondra (IE); Joe Hogan, Malahide (IE)

(73) Assignee: Openet Telecom Ltd., Dublin (IE)

( * ) Notice: Subject to any disclaimer, the term of this patent is extended or adjusted under 35 U.S.C. 154(b) by 53 days.

(21) Appl. No.: 13/159,710

(22) Filed: Jun. 14, 2011

(65) Prior Publication Data

US 2012/0233656 A1 Sep. 13, 2012

Related U.S. Application Data

(60) Provisional application No. 61/451,775, filed on Mar. 11, 2011.

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .................................. 726/22; 726/1; 705/52

(58) Field of Classification Search
None
See application file for complete search history.

(56) References Cited

U.S. PATENT DOCUMENTS

| | | | |
|---|---|---|---|
| 7,526,806 B2 * | 4/2009 | Wiley et al. | 726/23 |
| 2004/0193912 A1 | 9/2004 | Li et al. | |
| 2004/0250169 A1 * | 12/2004 | Takemori et al. | 714/38 |
| 2006/0015943 A1 * | 1/2006 | Mahieu | 726/25 |
| 2006/0123481 A1 * | 6/2006 | Bhatnagar et al. | 726/24 |
| 2006/0224750 A1 * | 10/2006 | Davies et al. | 709/229 |
| 2007/0006309 A1 | 1/2007 | Herbert et al. | |
| 2007/0293191 A1 * | 12/2007 | Mir et al. | 455/406 |
| 2010/0162381 A1 * | 6/2010 | Fried et al. | 726/13 |
| 2011/0314542 A1 * | 12/2011 | Viswanathan et al. | 726/23 |

FOREIGN PATENT DOCUMENTS

WO 2009/132700 A1 11/2009

OTHER PUBLICATIONS

European Search Report dated Jun. 20, 2012 issued in EP Application No. 12158921 mailed on Jul. 3, 2012.

* cited by examiner

*Primary Examiner* — Nadia Khoshnoodi
(74) *Attorney, Agent, or Firm* — The Marbury Law Group, PLLC

(57) ABSTRACT

Methods, systems and devices examine data flows in a communication system control network for known malware threats and suspicious properties typically associated with malware threats. A policy management system inside the control network accesses a user repository and a charging network, and performs pattern matching and/or observed behavior detection methods to determine if the data flows carry content (e.g., malware) that poses a security risk to network or wireless devices. The policy management system generates policy rules based on user preferences and risk-level. The policy management system sends the generated policy rules to a gateway/PCEF, which blocks the data flows, allows the data flows, or restricts the data flow based on the policy rules.

18 Claims, 9 Drawing Sheets

Internal Systems

External Systems

METHODS, SYSTEMS AND DEVICES FOR THE DETECTION AND PREVENTION OF MALWARE WITHIN A NETWORK

RELATED APPLICATIONS

This application claims the benefit of priority to U.S. Provisional Application No. 61/451,775, entitled "Policy Management Enhancement for Enabling the Detection and prevention of Malicious Software (Malware) within a network" filed Mar. 3, 2011 the entire contents of which is hereby incorporated by reference.

BACKGROUND

Recent advances in wireless and mobile technologies enable mobile-device users to access the Internet at any time and in any place. Internet usage habits are changing and many new types of Internet-enabled devices are emerging to meet the evolving user demands and changing Internet-usage habits. Many of these new and emerging Internet-enabled wireless devices use custom and/or non-traditional operating systems and access the Internet through mobile data networks. Further, many of these devices include powerful processors capable of executing third-party application software downloaded from digital application distribution platforms (e.g., Apple Inc.'s App Store, etc.). The emergence these new technologies and wireless devices presents additional security challenges for the telecommunications networks, mobile data networks and to the new wireless devices themselves.

Today, malicious software (herein "malware") may be used by thieves and hackers to steal confidential information, launch attacks on web servers and to flood networks with spam. Recently, there have been many high-profile cases of confidential customer information being stolen from businesses, and private wireless device users being subjected to online financial and identity thefts. Perhaps even more significantly, there has recently been an increase in wireless devices being infected by malware that forces the wireless device to participate in malicious activities without the user's knowledge or consent, causing users to incur higher usage-charges and leaving them vulnerable to potential legal actions. Recent press reports indicate this problem is increasing at an alarming rate. The emergence of these new types of Internet-enabled devices is likely to exacerbate these problems, as current malware detection and prevention techniques are ineffective at preventing or removing malware from wireless devices, especially the new breed of Internet-enabled wireless devices that have custom and/or non-traditional operating systems.

Further, the growth in popularity of application distribution platforms (herein "app ecosystems") allows wireless device users to more readily download third party software and execute the downloaded software with full administrative privileges on the mobile device. Such downloaded applications may be sourced from many different sources, such as email attachments, instant messaging systems, and device-to-device transfers. The emergence of app ecosystems presents additional security challenges that are distinct from the traditional security challenges presented by a malicious page being displayed within web browsers which could be managed by implementing a sandbox model.

Current malware detection and prevention techniques typically involve installing a protective software client application onto a traditional Internet-enabled device, such as a desktop computer or a laptop computer. Thus, current techniques aim to prevent malware by protecting user-level devices (e.g., laptops) rather than providing a comprehensive solution that can eliminate malware from within the network. Further, since many of the new and emerging Internet-enabled wireless devices do not have traditional operating systems, they cannot effectively employ existing malware detection and prevention techniques. As these new Internet-enabled devices grow in popularity, so will the importance of detecting and preventing malware from within the network.

SUMMARY

The various embodiments provide methods, systems and devices for receiving from one or more communication system control network components data flow parameters identifying characteristics of a data flow, performing a detection method to determine if the data flow carries malicious content, generating restrictive policy rules in response to determining the data flow carries malicious content, generating non-restrictive policy rules in response to determining the data flow does not carry malicious content, and pushing the generated policy rules to a communication system gateway configured to control the flow of packet-based data between a wireless device and an external network. In various embodiments, generating restrictive policy rules in response to determining the data flow carries malicious content includes generating restrictive policy rules that instruct the gateway to block the data flow and/or to block future data flows originating from the wireless device. The data flow may originate from a wireless device or an Internet server.

Various embodiment methods, systems and devices may perform charging operations that charge subscriber accounts for data flows allowed by the gateway and not charge subscriber accounts for the data flows blocked by the gateway.

Pattern matching detection methods may be performed in embodiment methods, systems and devices to determine if the data flow carries content that is a security risk. In an embodiment, pattern matching detection methods may be performed by comparing identified binary-file characteristic information with a binary-file characteristic of a known malware type to determine if the data flow carries content having binary-file characteristics of known malware, which may include comparing the identified binary-file characteristic information with a binary-file characteristic of a spam-sending Internet bot.

The embodiments include servers configured to implement the various methods through software programming, systems implementing such servers, and non-transitory computer-readable storage media on which are stored server-executable instructions implementing the various methods.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

Figure 1:
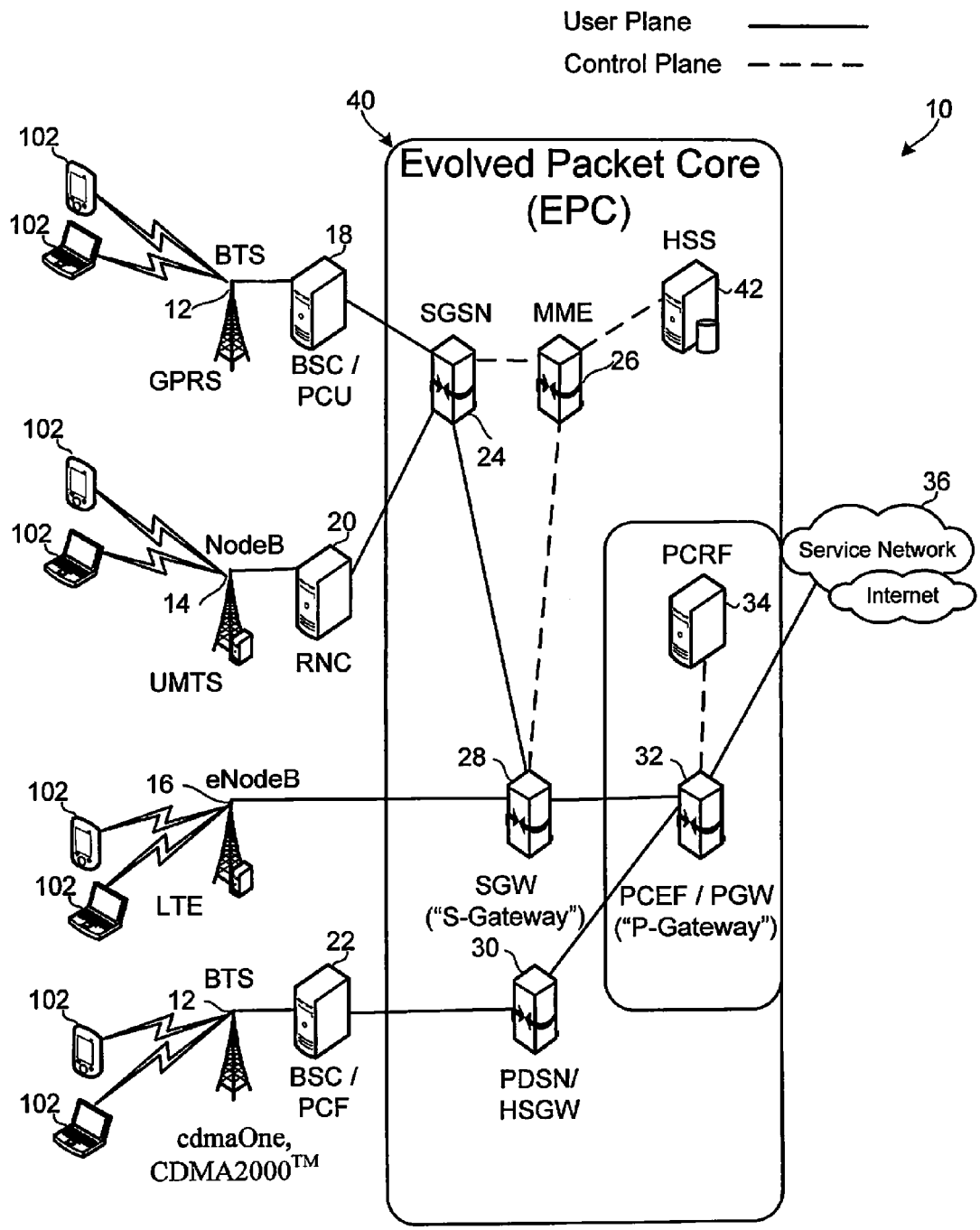
FIG. 1 is a communication system block diagram illustrating network components of a communication system having a third generation partnership project (3GPP), evolved packet core (EPC) architecture suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device," "wireless device" and "user equipment (UE)" may be used interchangeably and refer to any one of various cellular telephones, smart-phones (e.g., iPhone®), personal data assistants (PDA's), palm-top computers, laptop computers, wireless electronic mail receivers (e.g., the Blackberry® and Treo® devices), VoIP phones, multimedia/Internet enabled cellular telephones, and similar electronic devices capable of sending and receiving wireless communication signals. A wireless device may include a programmable processor and memory.

As used herein, the term "bot" is used to refer to software applications that emulate human online-activity by automatically performing tasks typically performed by human computer users.

As used herein, the phrase "malware protection system" is used to refer to any system configured to detect, prevent and/or remove malware such as computer viruses, computer worms, Trojan horses, bots, spyware, adware, etc. Thus, a malware protection system may include a malware prevention system, a malware detection system, a malware removal system, or any other system that assists the detection, prevention and/or removal of malware, as well as combinations of such systems.

A number of different cellular and mobile communication services and standards are available or contemplated in the future, all of which may implement and benefit from the various embodiments. Such services and standards include, e.g., 3rd generation partnership project (3GPP), long term evolution (LTE) systems, 3rd generation wireless mobile communication technology (3G), 4th generation wireless mobile communication technology (4G), global system for mobile communications (GSM), universal mobile telecommunications system (UMTS), 3GSM, general packet radio service (GPRS), code division multiple access (CDMA) systems (e.g., cdmaone, CDMA2000™), worldwide interoperability for microwave access (WiMAX), enhanced data rates for GSM evolution (EDGE), advanced mobile phone system (AMPS), digital AMPS (IS-136/TDMA), evolution-data optimized (EV-DO), digital enhanced cordless telecommunications (DECT), and integrated digital enhanced network (iden). Each of these technologies involves the transmission and reception of signaling and content messages. It should be understood that any references to terminology and/or technical details related to an individual standard or technology are for illustrative purposes only and are not intended to limit the scope of the claims to a particular broadcast communication system or technology unless specifically recited in the claim language.

As discussed above, Internet usage habits are changing and many new types of Internet-enabled devices are emerging to meet evolving user demands. The emergence of these devices presents new security challenges that cannot be addressed by existing antivirus/malware detection and removal systems. For example, current malware detection and prevention techniques attempt to prevent malware by protecting user-level devices (e.g., laptops) rather than from within the network. Since many new and emerging Internet-enabled devices do not having traditional operating systems, current malware detection and prevention techniques cannot efficiently detect or prevent malware.

The various embodiments provide a comprehensive security solution for detecting and preventing malware from within a mobile data network. The various embodiments protect mobile devices from becoming infected with malicious software (malware) and protect Internet servers and network components from attacks (e.g., denial of service attacks) and inconveniences (e.g., spam) caused by malware. The various embodiments detect both known and yet-to-be identified security threats by performing pattern matching and observed behavior detection methods. Various embodiments monitor network traffic for suspicious content or activities to detect malware and block suspicious data flows from within the network.

Various embodiments provide methods for detecting and preventing malware from within a data network by combining a policy management component, which has a global or near global view of network traffic and transactions, with a malware system detection component configured to recognize malware based upon patterns within the network traffic and transactions. The various embodiments may operate exclusively within the network and support any type of Internet device.

The various embodiments may detect transmissions of known and unknown malware in real time as the network patterns emerge. Various embodiments may enable defensive and ameliorative actions, such as modifying the transmissions of the malware or transmission generated by malware, which may include throttling malware transmissions. Various embodiments may prevent the transmission of malware once it has been detected. Various embodiments may alert wireless device users of detected malware. Various embodiments may alert telecommunications network operators of detected malware so they can take corrective actions and/or warn targets of an attack. The various embodiments may include machine learning mechanisms to enable the malware protection system to learn about malware-generated transmissions and recognize malware patterns as they develop. Such machine learning capabilities may include tracking or correlating network activity levels of recognized threats as well as details of suspicious activities not yet recognized as threatening. Various embodiments may store user-specific malware detection (e.g., patterns in network traffic that occurred while a malware event was underway) and prevention information (e.g., countermeasures that proved effective in responding to a malware event), which may be used by the malware protection system for the detection and prevention of future malware events. Various embodiments may map specific malware threats identified to users of the network. Malware threats may be identified using any suitable mechanism, including the use of IP addresses.

The various embodiments may push client software capable of exchanging malware and security information with a control network to wireless devices. The malware and security information may include report details generated by the client, alerts generated by the system, instructions from the system to the client that relate to a specific threat to the client, and/or instructions that instruct the wireless device to change its behavior. In an embodiment, the malware and security information may include instructions that instruct a first application executing on the wireless device to cause a second application executing on the wireless device to change its behavior.

The various embodiments may detect spam by recognizing network traffic with certain characteristics, which may include destination information, protocols, and/or payload content. The various embodiments may protect networks by preventing wireless devices from being used as a source of malware attacks. Various embodiments may detect denial of service attacks by recognizing rapid increases in traffic addressed to a single or related destination from multiple sources. Various embodiments may prevent spam and denial of service attacks by throttling or blocking suspected malicious traffic.

The various embodiments may reduce the need for network operators to augment capacity and provide network congestion relief. The various embodiments may send detection and prevention information to telecommunications network operators, wireless devices and/or malware systems in real time.

The various embodiments may be implemented within a variety of mobile communication systems, an example of which is illustrated in FIG. 1. Wireless devices 102 may be configured to send and receive voice, data and control signals to and from a service network 36 (and ultimately the Internet) using a variety of communication systems/technologies (e.g., GPRS, UMTS, LTE, cdmaOne, CDMA2000™, etc). For example, general packet radio service (GPRS) data transmitted from a wireless device 102 is received by a base transceiver station (BTS) 12 and sent to a base station controller (BSC) and/or packet control unit (PCU) component (BSC/PCU) 18. Code division multiple access (CDMA) data transmitted from a wireless device 102 is received by a base transceiver station 12 and sent to a base station controller (BSC) and/or point coordination function (PCF) component (BSC/PCF) 22. Universal mobile telecommunications system (UMTS) data transmitted from a wireless device 102 is received by a NodeB 14 and sent to a radio network controller (RNC) 20. Long term evolution (LTE) data transmitted from a wireless device 102 is received by an eNodeB 16 and sent directly to a serving gateway (SGW) 28 located within the EPC 40.

The BSC/PCU 18, RNC 20 and BSC/PCF 22 components process the GPRS, UMTS and CDMS data, respectively, and send the processed data to a node within the EPC 40. More specifically, the BSC/PCU 18 and RNC 20 units send the processed data to a serving GPRS support node (SGSN) 24 and the BSC/PCF 22 sends the processed data to a packet data serving node (PDSN) and/or high rate packet data serving gateway (HSGW) component (PDSN/HSGW) 30. The PDSN/HSGW 30 may act as a connection point between the radio access network and the IP based PCEF/PGW 32. The SGSN 24 is responsible for routing the data within a particular geographical service area and may send signaling (control plane) information (e.g., information pertaining to call setup, security, authentication, etc.) to a mobility management entity (MME) 26. The MME may request user and subscription information from a home subscriber server (HSS) 42, perform various administrative tasks (e.g., user authentication, enforcement of roaming restrictions, etc), select a SGW 28 and send administrative and/or authorization information to the SGSN 24.

Upon receiving the authorization information from the MME 26 (e.g., authentication complete, identifier of a selected SGW, etc.), the SGSN 24 sends the GPRS/UMTS data to a selected SGW 28. The SGW 28 stores information about the data (e.g., parameters of the IP bearer service, network internal routing information, etc.) and forwards user data packets to a policy control enforcement function (PCEF) and/or packet data network gateway (PGW) 32. The PCEF/PGW 32 sends signaling information (control plane) to a policy control rules function 34. The PCRF 34 accesses subscriber databases, creates a set of intelligent policy rules and performs other specialized functions (e.g., interacts with online/offline charging systems, application functions, etc.) and sends the intelligent policy rules to the PCEF/PGW 32 for enforcement. The PCEF/PGW 32 implements the policy rules to control the bandwidth, the quality of service and the characteristics of the data, services and flows being communicated between the service network 36 and the end users.

Figure 2:
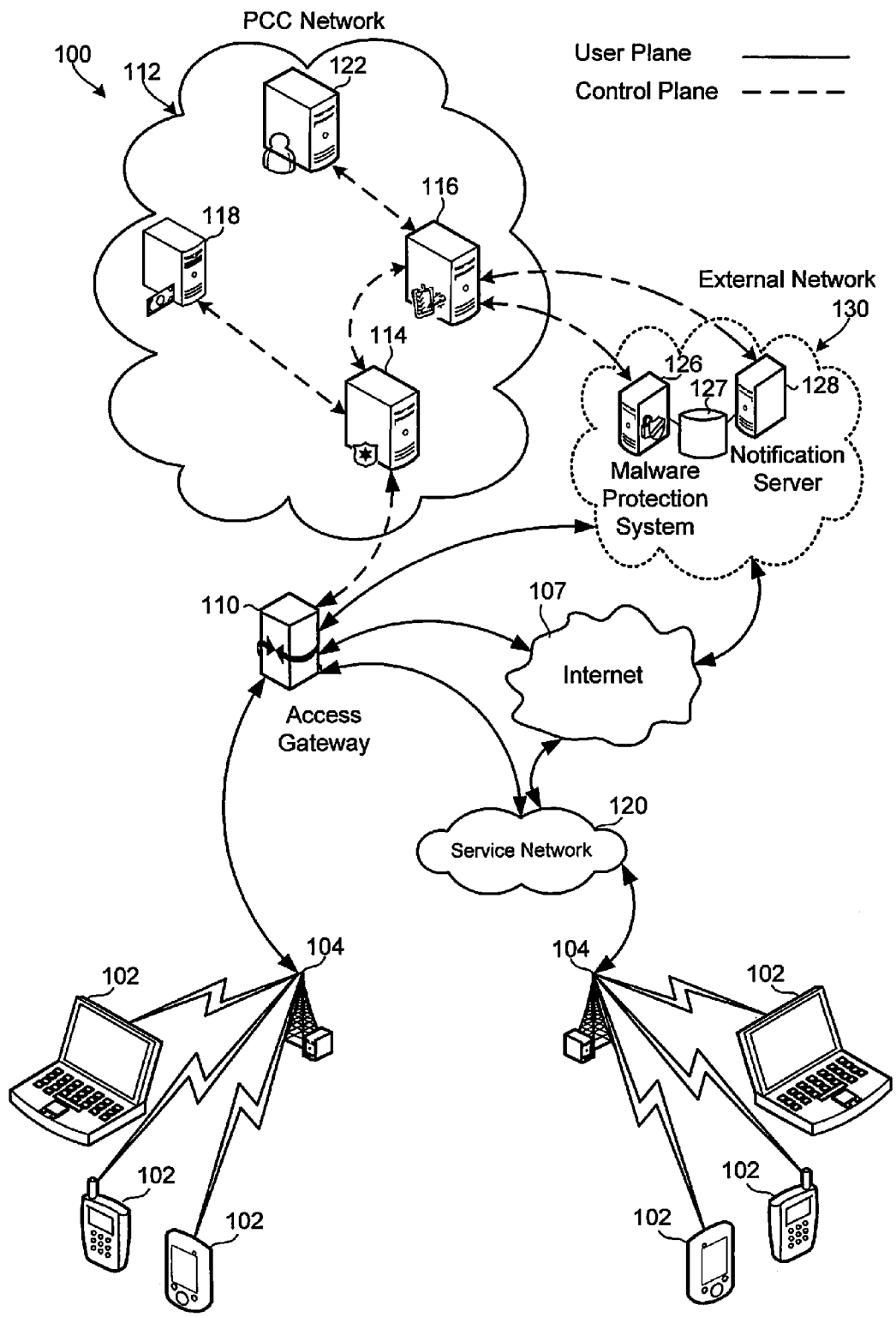
FIG. 2 is a communication system block diagram illustrating network components and of an example communication-system having a policy and charging control (PCC) network in accordance with the various embodiments.

FIG. 2 illustrates various logical components in an example communication system 100 suitable for implementing the various embodiments. Wireless devices 102 may be configured to communicate via cellular telephone network, a radio access network (e.g., UTRAN, RAN, etc.), WiFi network, WiMAX network, and/or other well known technologies (e.g., GPRS, UMTS, LTE, cdmaOne, CDMA2000™). Wireless devices 102 may be configured to transmit and receive voice, data and control signals to and from a base station (e.g., base transceiver station, NodeB, eNodeB, etc.) 104, which may be coupled to a controller (e.g., cellular base station, radio network controller, service gateway, etc.) operable to communicate the voice, data, and control signals between mobile devices and to other network destinations. The base station 104 may communicate with an access gateway 110, which serves as the primary point of entry and exit of wireless device traffic and connects the wireless devices 102 to their immediate service provider and/or packet data networks (PDNs). The access gateway 110 may be a part of the policy control and charging network 112 or external to the policy control and charging network 112, and may include one or more of a controller, a gateway, a serving gateway (SGW), a packet data network gateway (PGW), an evolved packet data gateway (ePDG), a packet data serving node (PDSN), a serving general packet radio service support node (SGSN), a policy and charging enforcement function (PCEF), or any combination of the features/functions provided thereof. The access gateway 110 may be implemented in a single computing device or in many computing devices, either within a single network or across a wide area network, such as the Internet.

The access gateway 110 may forward the voice, data, and control signals to other network components as user data packets, provide connectivity to external packet data networks, manage and store contexts (e.g. network internal routing information, etc.) and act as an anchor between different technologies (e.g., 3GPP and non-3GPP systems). The access gateway 110 may also coordinate the transmission and reception of data to and from the Internet 107, and the transmission and reception of voice, data and control information to and from an external service network 120 connected to the Internet 107 and other base stations 104 and wireless devices 102. The access gateway 110 may also route control/signaling information to a policy and charging control (PCC) network 112, which may be a part of an implementation of an evolved packet core (EPC)/long term evolution (LTE) architecture.

The PCC network 112 may include a gateway and/or policy and charging enforcement function (PCEF) 114 component for controlling the flow of Internet protocol (IP) data between mobile devices 102 and external networks (e.g., Internet 107, service network 120, etc.). The gateway/PCEF 114 may contain a deep packet inspection (DPI) component (not illustrated) configured to obtain additional application-level information about a particular IP data flow and provide the information to other components in the PCC network 112. In various embodiments, the gateway/PCEF 114 may be integrated with, or a part of, the access gateway 110, either within the PCC network 112 or outside of the PCC network 112.

The policy and charging control network 112 may also include a policy management system 116, a charging system 118 and a user repository 122. The policy management system 116 may communicate with a malware protection system 126 and a notification server 128 in a network (External Network) 130 outside the telecommunications provider network. The notification server 128 may be configured to receive requests from the policy management system 116 (e.g., PCRF) and send messages to mobile devices 102 using various technologies/mechanisms, such as email, short message service (SMS) texts, instant messaging (IM) systems, interactive voice response (IVR) systems. The notification server 128 may also send messages in a mobile device-specific format, which may be unique to each mobile device type. The notification server 128 may choose a communications technology/mechanism on a case-by-case basis. For example, the notification server 128 may choose a communications technology/mechanism depending on the user's preferences and/or mobile device type. Messages may be sent through the Internet 107 or the access gateway 110. In an embodiment, the notification server 128 may send messages to a client application running on the mobile devices 102 (e.g., via the Internet 107, access gateway 110, etc.), which may send a response to the notification server 128 for forwarding to the policy management system 116.

In an embodiment, the notification server 128 may be configured to send messages to mobile devices 102 "in-band" or "out-of-band." The in-band notifications may use the same communication mechanism used for receiving message and the out-of-band notifications may use a different communication mechanism than that used for receiving message. For example, if a user is browsing web pages and receives an in-band notification, then the notification may appear as a new web page.

The malware protection system 126 may be a dedicated malware system or server, which is sometime referred to herein as a "malware expert system." The malware protection system 126 may be implemented within one or a number of dedicated servers located within the communication network 100, or within one or a number of dedicated servers located external from but with communication links to the communication network 100 (as illustrated). In a further embodiment, some or all elements of the malware protection system 126 functionality may be implemented within a server performing another network function, such as the policy management system 116, a charging system 118 or a user repository 122.

The malware protection system 126 may maintain a repository of known security risks, gather real-time information regarding emerging security/malware threats, identify security/malware threats by monitoring traffic within the communication network 100, and generate security/malware threat counter-measures. Such security/malware threat counter-measures may include malware removal software and/or malware repair software. In an embodiment, the malware protection system 126 may be configured to generate security/malware threat counter-measures, malware removal software and/or malware repair software in a format specific to each mobile device 102 type. The mobile device formats may be defined by configuration or determined in real time by the policy control system 116, or by the malware protection system 126 based on information received in real time from the policy control system 116.

The malware protection system 126 may also include a local malware prevention memory or database 127 for each policy management system 116. Likewise, the policy management system 116 may include a local policy management memory (not illustrated), which may be populated by the policy management system 116, the malware protection system 126, or both. In an embodiment, the malware protection system 126 may push data to the policy management memory of the policy management system 116. In an embodiment, the policy management system 116 may periodically request information from the malware protection system 126 and populate the policy management memory with the received information.

Figure 3A:
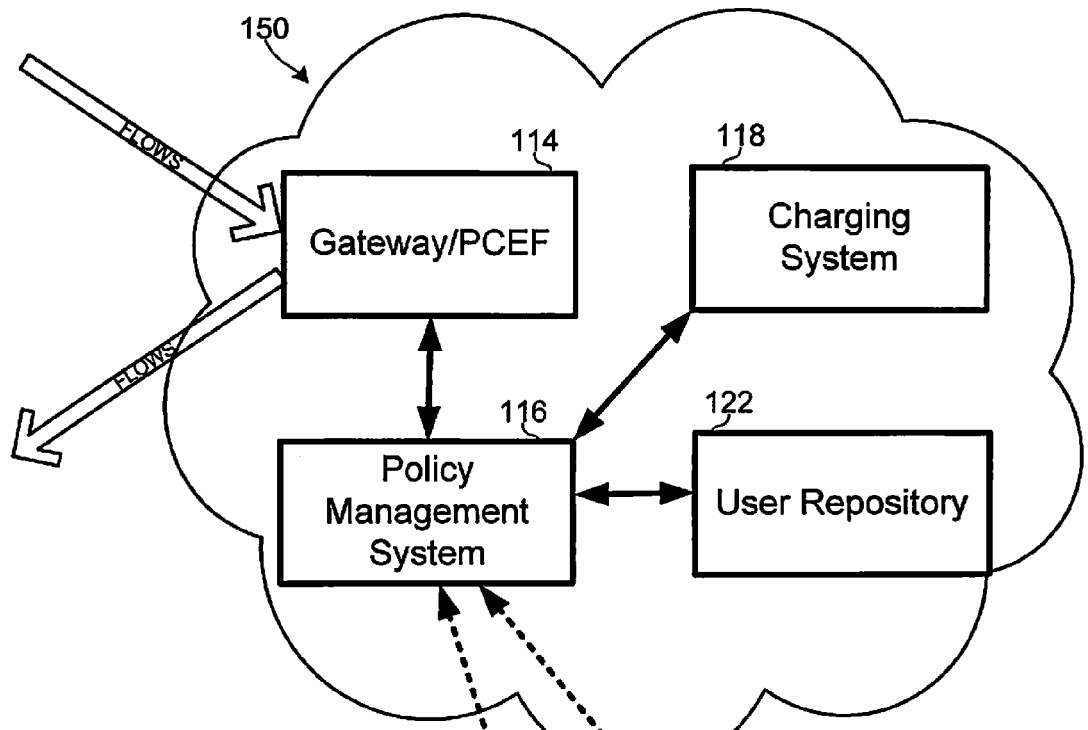
FIG. 3A is a communication system block diagram illustrating example communications between logical components in an example control network and an external network.
Figure 3A:
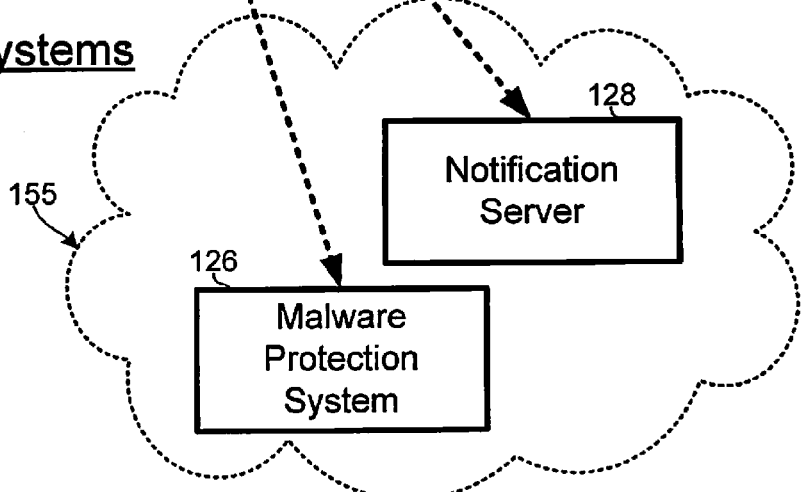

FIG. 3A is a system architecture diagram illustrating communications between logical components in an example control network 150 (e.g., PCC network) and an external network 155. FIG. 3 illustrates that the control network 150 may include one or more components for providing a policy and charging enforcement function (PCEF) 114, a policy management system 116, a charging system 118, and a user repository 122. The gateway/PCEF 114 may be a part of, or perform operations typically associated with, a gateway GPRS support node (GGSN), a packet data network gateway (PGW), an access gateway 110, or other similar components. In an embodiment, the policy management system 116 may include a policy and charging rules function (PCRF). In an embodiment, the charging system 118 may include an off-line charging system (OFCS) and an on-line charging system (OCS). In an embodiment, the user repository 122 may include a subscriber profile repository (SPR).

The gateway/PCEF 114 may serve as the primary enforcement point, as a gateway and as a router providing a routing mechanism between the Internet and the radio infrastructure/radio access network. The gateway/PCEF 114 may receive signaling flows and use information contained therein to select an optimal route for a particular type of communication, session, or quality of service (QoS). The gateway/PCEF 114 may also enforce various policies on the received flows, which may include querying, coordinating and/or adjusting various network resources based on a set of policy rules provided by the policy management system 116.

The policy management system 116 may identify appropriate policy rules for a given situation and send the identified policy rules to the gateway/PCEF 114 for enforcement. Each policy rule may govern the services, quality of service (QoS) and/or bandwidth that are made available to a particular subscriber in a particular data call and/or session. The policy rules may also govern when certain services are made accessible to the subscriber (e.g. weekdays from 9 AM to 5 PM, etc.) and how long the subscriber may access to those services (e.g., 15 minutes at a time, a total of two hours, etc.). The policy rules may further govern whether specific IP data flows should be "blocked," "allowed" or "allowed with constraints," based on current and potential security risks/malware threats, as discussed in further detail below.

In an embodiment, the policy management system 116 may generate, compile and select a set of business, technology and security rules that define the policies that are to be enforced. In doing so, the policy management system 116 may communicate with the user repository 122 and/or the charging system 118. The user repository 112 may store subscriber information (e.g., customer IDs, preferences, subscription levels, etc.) and user-specific information, such as details of a user's subscription to malware prevention services and historical details of a user's exposure to specific malware threats. The charging system 118 may store information pertaining to how much wireless data is being used by a wireless subscriber and information pertaining to whether the subscriber has sufficient funds/credits/access units to receive a requested service/flow. The policy management system 116 may use the information stored by the user repository 122 and charging system 118 to identify potential security risks/malware threats and user preferences for responding to identified security risks/malware threats and make rule decisions based on a combination of the risk/threat and user preference. The policy management system 116 may make the rule decisions on a per-subscriber, per-session and/or per-service basis. For example, the policy management system 116 may use subscriber information (e.g., subscriber's city of residence), the current usage parameters (e.g., day of week, time of day, peak hours, etc.) and the subscriber's service level (e.g., Gold, Bronze, etc.) in conjunction with identified security risks (e.g., known virus, irregular usage patterns, etc.) and user preferences to generate and/or select one or more rules or rule groups, which are pushed to the gateway/PCEF 114 for enforcement.

The policy management system 116 may also communicate with external systems 155, such as a malware protection system 126 and a notification server 128. As mentioned above, the malware protection system 126 may maintain a repository of known malware threats, gather information regarding emerging malware threats, identify current and potential malware threats and generate malware threat counter-measures, malware removal software and/or malware repair software to neutralize the security threats. The policy management system 116 may send information to the malware protection system 126 to aid in the malware prevention operations. Likewise, the malware protection system 126 may send security related information to the policy management system 116 to aid in the rule making decisions/operations.

Figure 3B:
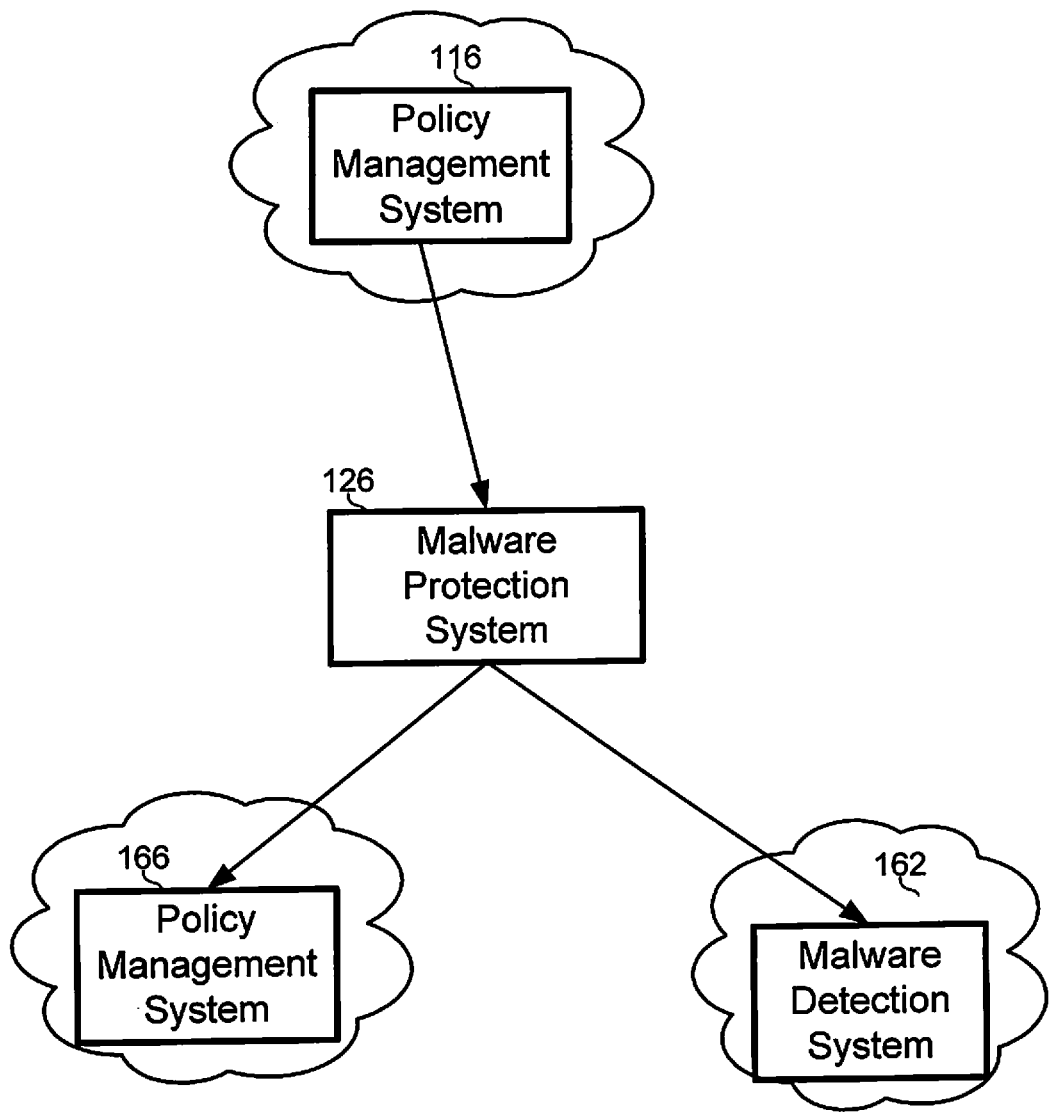
FIG. 3B is an communication system block diagram illustrating example communications between a malware protection system and external networks in accordance with various embodiments.

FIG. 3B is a system architecture diagram illustrating communications between policy management systems and malware protection systems. Specifically, FIG. 3B illustrates that the malware protection system 126 may receive information from the policy management system 116, and share information with other policy management systems (e.g., policy management systems 166) or external antivirus/malware protection systems (e.g., malware detection system 162).

In an embodiment, the policy management system 116 may provide malware detection feedback to the malware protection system 126. In an embodiment, the malware detection feedback may include detection rate information extracted from the IP data flows. The detection rate information may identify the detection rates of known malware threats and include additional parameters (e.g., wireless device type, location of a wireless device, etc.) readily accessible to components within the control network (e.g., policy management system 116, gateway/PCEF 114, etc.). These communication system control network components are generally unavailable to external services and servers (e.g., antivirus servers, malware detection systems, etc.). Such additional parameters may be carried by the IP data flows, extracted by the gateway/PCEF 114 and/or the policy management system 116 and sent to the malware protection system 126. The malware protection system 126 may then use this information to update its malware protection services (e.g., to update lists, generate new prevention software, etc.).

In an embodiment, the policy management system 116 may send the malware protection system 126 information relating to IP data flows with suspicious characteristics. This information may be used by the malware protection system 126 to identify emerging and unidentified malware threats that are not yet prevalent enough to be known to the malware protection system 126. The malware protection system 126 may also use this information to develop preemptive or preventative countermeasures for the identified malware threats.

In an embodiment, the policy management system 116 may send malware protection system sample data extracted from IP traffic flows within the detection feedback, which the malware protection system 126 may use for analyzing the malware threats.

In an embodiment, the malware protection system 126 can subsequently share information received from the policy management system 116 with other policy management systems (e.g., policy management systems 166) in other mobile data networks (e.g., roaming/home networks, external networks, etc.) and/or with independent malware protection systems (e.g., malware detection system 162) operating in private data networks, such as corporate networks, etc.

Figure 4A:
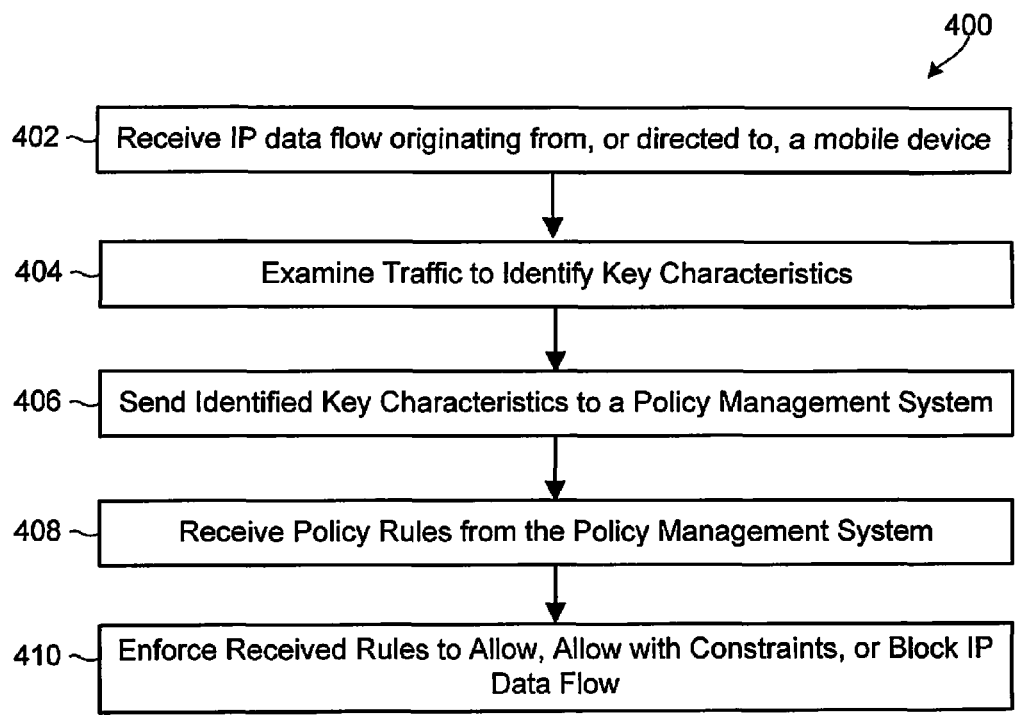
FIG. 4A is a process flow diagram illustrating an example method for receiving signaling flows and enforcing policy rules on the signaling flows in accordance with various embodiments.

FIG. 4A illustrates an example gateway/PCEF method 400 for receiving signaling flows and enforcing policy rules on the signaling flows in accordance with the various embodiments. This embodiment method 400 may be implemented in a server configured with server-executable instructions configured to cause the server to perform the operations of the method steps. In step 402, the gateway/PCEF may receive a data flow originating from, or destined for, a wireless device. In step 406, the gateway/PCEF may examine the data flows and/or the network traffic, identify key characteristics of the data flows and/or network traffic, generate parameters based on the key characteristics and send the generated parameters to a policy managements system for analysis. In step 408, the gateway/PCEF may receive one or more policy rules from the policy management system. In step 410, the gateway/PCEF may use the received policy rules to enforce the various policies discussed above, such as blocking, restricting, or allowing the data flow to be sent to, or received from, a wireless device.

Figure 4B:
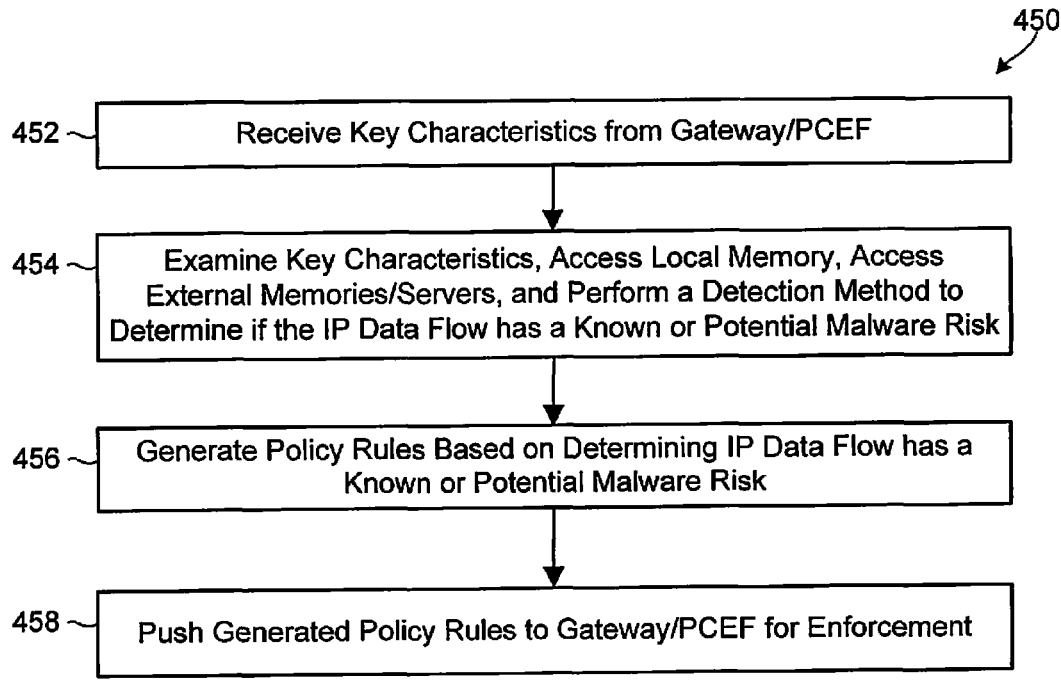
FIG. 4B is a process flow diagram illustrating an example policy management system method for receiving parameters from a gateway and generating rules in accordance with the various embodiments.

FIG. 4B illustrates an example policy management system method 450 for receiving parameters from a gateway/PCEF and generating/selecting rules in accordance with the various embodiments. In step 452, the policy management system may receive parameters generated by the gateway/PCEF. In step 454, the policy management system may use the received parameters to determine if the data flows carry content (e.g., malware) that poses a security risk to network and/or wireless devices. For example, the policy management system may use the parameters to perform pattern matching detection methods or observed behavior detection methods to determine if the data flow carries malicious content or is otherwise a security risk. The policy management system may retrieve information from a local memory and/or request/receive information from external memories/systems/servers (e.g., user repository, charging system, a malware protection system, etc.) that may be used to determine if the data flows carry content (e.g., malware) associated with a potential or known security risk. In step 456, the policy management system may generate/select policy rules based on determining the data flows carry content that poses a "known risk," a "potential risk," or "no risk." In step 458, the policy management system may send the generated/selected policy rules to the gateway/PCEF for enforcement.

As mentioned above, the policy management system may retrieve information from a local memory as well as from external memories/systems/servers. In an embodiment, the policy management system may first access the local memory before requesting information from the external memories/systems/servers to reduce latency and improve efficiency. In an embodiment, if the local memory identifies the data flow as carrying a potential security risk, the policy management system may forgo accessing the external memories/systems/servers and generate rules based on the information in the local memory. This reduces latency and improves efficiency because fewer operations and external communications are required to make intelligent policy rule decisions.

Figure 5:
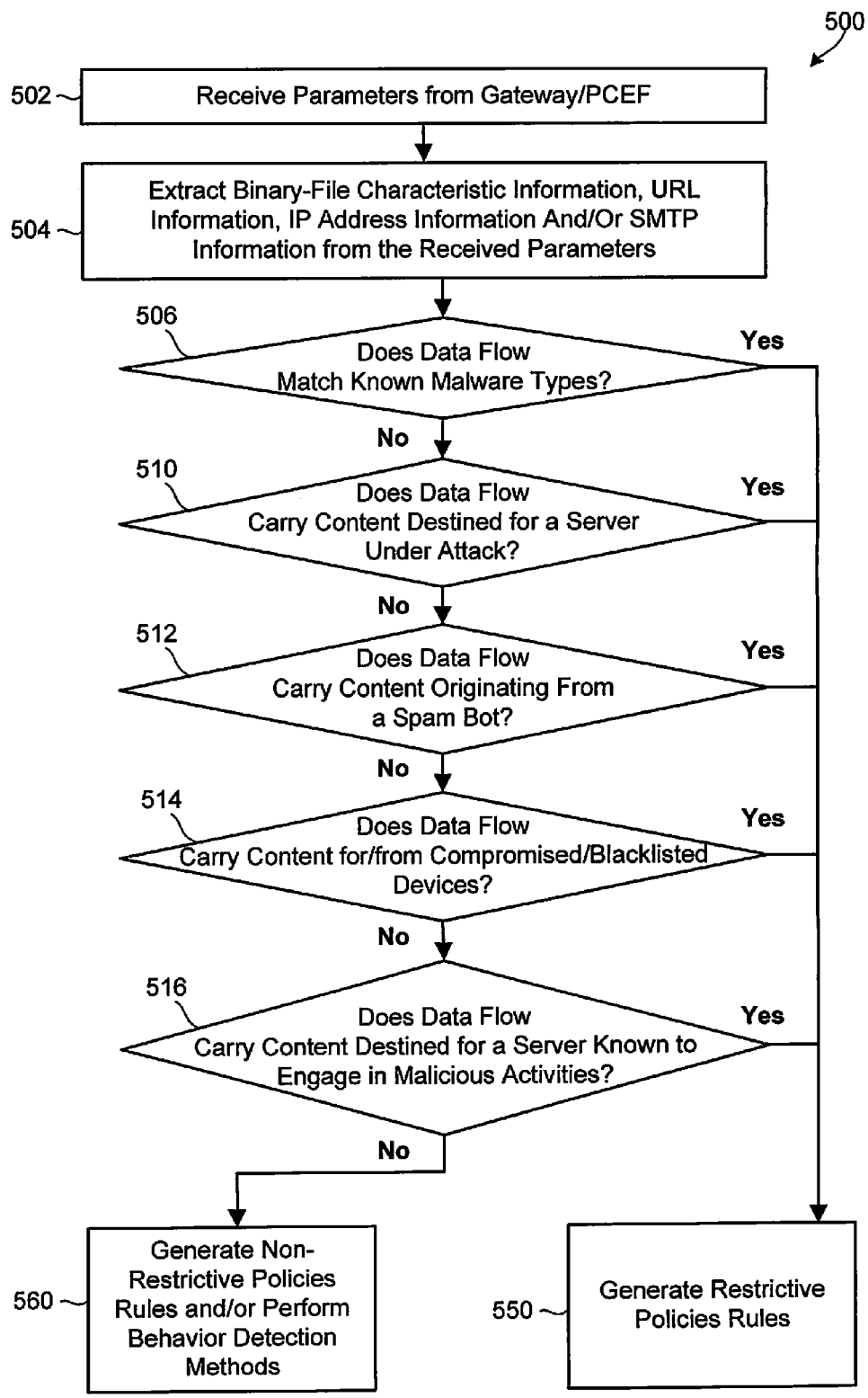
FIG. 5 is a process flow diagram illustrating an example pattern matching detection method in accordance with an embodiment.

FIG. 5 illustrates an example pattern matching detection method 500, which may be performed by the policy management system to determine if an IP data flow carries content (e.g., malware) that poses a security risk. In step 502, the policy management system may receive parameters identifying certain key characteristics of the IP data flows and/or network traffic. In step 504, the policy management system may examine the parameters to identify/extract information that may be used to determine if the data flow carries content that poses an unacceptable security risk to a wireless device, the network, or both. For example, in step 504, the policy management system may extract binary-file characteristic information, uniform resource locator (URL) information (e.g., from the HTTP-headers of IP packets), IP address information and/or simple mail transfer protocol (SMTP) information (e.g., from SMTP headers/bodies of outgoing emails) from the received parameters.

In determination step 506, the policy management system may compare the extracted binary-file characteristic information with binary-file characteristics of known malware types (e.g., bots, viruses, worms, Trojan Horses, etc.) to determine if the data flow carries content having binary-file characteristics of known malware (e.g., bots, viruses, worms, Trojan Horses, etc). If the policy management system determines that the data flow carries content that has binary-file characteristics in common with known malware (i.e., determination step 506="Yes"), in step 550, the policy management system may generate restrictive policies rules (e.g., "block content," "allow with constraints," etc.) based on the severity of the risk and push the generated rules to the gateway/PCEF. In an embodiment, the policy management system may generate restrictive policy rules that instruct the gateway/PCEF to block the IP data flow upon determining that an IP data flow carries content having binary-file characteristics of known malware threats (e.g., viruses, Trojan Horses, etc.).

If the policy management system determines that the data flow does not carry content having binary-file characteristics of known malware types (i.e., determination step 506="No"), in determination step 510, the policy management system may compare extracted URL information against a list of URLs known to be under attack (e.g., denial-of-service attack, etc.) to determine if the destination of data flow content is a server under attack. If the policy management system determines that the data flow carries or is likely to carry content destined for a server under attack (i.e., determination step 510="Yes"), in step 550, the policy management system may generate policy rules (e.g., "block content," "allow with constraints," etc.) based on various factors (e.g., severity of the risk, subscriber's usage history, subscription level, likelihood request is genuine, etc.) and push the generated rules to the gateway/PCEF. In an embodiment, the policy management system may generate an "allow with constraints" rule upon determining that the IP data flow represents a malware threat (e.g., carries content destined for a server under attack), but does not contain a binary that is a malware threat (e.g., carries content having binary-file characteristics of known malware). In an embodiment, the policy management system may generate rules that include constraints that set an upper threshold on the rate of IP data flows and/or introduce an artificial latency to the IP data flow. In this manner, the policy management system may generate intelligent policy rules to prevent attacks on servers, in real time and from within the network, without shutting off all communications to a particular Internet site.

If the policy management system determines that the data flow does not carry content destined for a server under attack (i.e., determination step 510="No"), in determination step 512, the policy management system may compare SMTP information of emails carried by a data-flow with known spam heuristics (e.g., incorrect SMTP headers, origin IP address blacklisting, email not relayed, message body contains blacklisted keywords, message attachment scanning using Optical Character Recognition (OCR) techniques, Artificial Intelligence (AI) based methods such as Bayesian filtering, or any combination of these) to determine if the emails originate from a spam-sending bot. If the policy management system determines that the data-flow carries an email that originates from a spam-sending bot (i.e., determination step 512="Yes"), in step 550, the policy management system may generate restrictive policy rules that block or restrict the data flow and push the generated rules to the gateway/PCEF for enforcement. In an embodiment, the policy management system may generate an "allow with constraints" rule upon determining that the IP data flow carries content from a known spam bot. In this manner, the policy management system may generate intelligent policy rules to reduce spam, in real time and from within the network, without filtering desired emails/communications.

If the policy management system determines that the IP data flow does not carry an email that originates from a spam-sending bot (i.e., determination step 512="No"), in determination step 514, the policy management system may compare the IP address information with a list of known offender IP addresses to determine if the IP data flow originates from, or is destined for, a mobile device that is compromised (e.g., infected with malware, a virus, etc.) or blacklisted (e.g., known to intentionally engage in malicious activities). If the policy management system determines that the IP address information is associated with an IP address in the list of known offender IP addresses (i.e., determination step 514="Yes"), in step 550, the policy management system may generate policy rules that block or restrict the data flow and push the generated rules to the gateway/PCEF for enforcement. In an embodiment, the policy management system may generate an "allow with constraints" rule upon determining that the IP data flow carries content originating from, or destined for, a mobile device that is compromised or blacklisted. In this manner, the policy management system may generate intelligent policy rules to prevent the wireless device, a network server, or both from engaging in malicious activities, without blocking all the services/communications between a wireless device and a network component.

If the policy management system determines that the IP address information is not associated with an IP address in the list of known offender IP addresses (i.e., determination step 514="No"), in determination step 516, the policy management system may compare the URL information to a list of known offender network addresses (e.g., URLs) to determine if the data flow is destined for a website/server known to engage in malicious activities. If the policy management system determines that the URL information is associated with a URL in the list of known offender URLs (i.e., determination step 516="Yes"), in step 550, the policy management system may generate restrictive policy rules and push the generated rules to the gateway/PCEF for enforcement. In an embodiment, the policy management system may generate an "allow with constraints" rule upon determining that the IP data flow carries content destined for a website/server known to engage in malicious activities, without blocking all access to the website/server.

If the policy management system determines that the URL information is not associated with a URL in the list of known offender URLs (i.e., determination step 516="No"), in step 560, the policy management system may generate rules to allow the flow, or perform additional operations (e.g., observed behavior detection methods) to determine if the data flow carries content (e.g., malware) that poses a security risk to a wireless device, network server, or both.

In an embodiment, the policy management system may perform observed behavior detection methods to determine if the data flow carries content (e.g., malware) that may be harmful or a security risk to the network/wireless devices. The policy management system may perform the observed behavior detection methods instead of, or in addition to, the pattern matching detection methods discussed above. Observed behavior detection methods allow the policy management system to detect emerging and yet-unidentified security risks (e.g., malware threats) that are not yet prevalent enough to be known to the malware protection system or third party antivirus/security systems. The observed behavior detection methods may exploit the policy management system's access to the control network information to monitor IP data flows for suspicious characteristics and to identify security risks. For example, the policy management system may access information stored in a user repository and/or charging system in a control network to identify and neutralize security risks that cannot be identified or neutralized by systems that do not have access to user/charging information (e.g., components outside the control network).

Figure 6A:
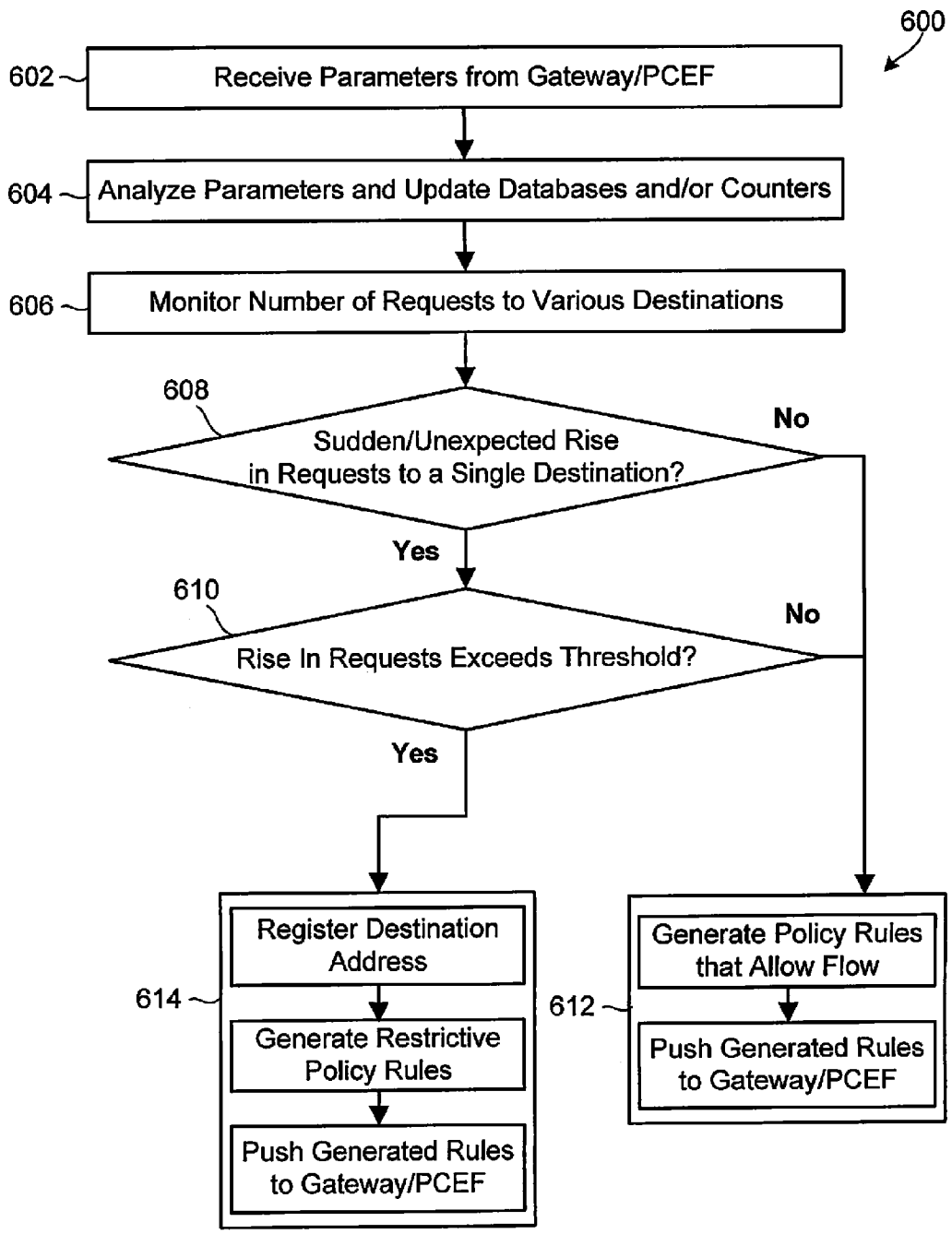
FIGS. 6A and 6B are process flow diagrams illustrating example observed behavior detection methods in accordance with various embodiments.
Figure 6B:
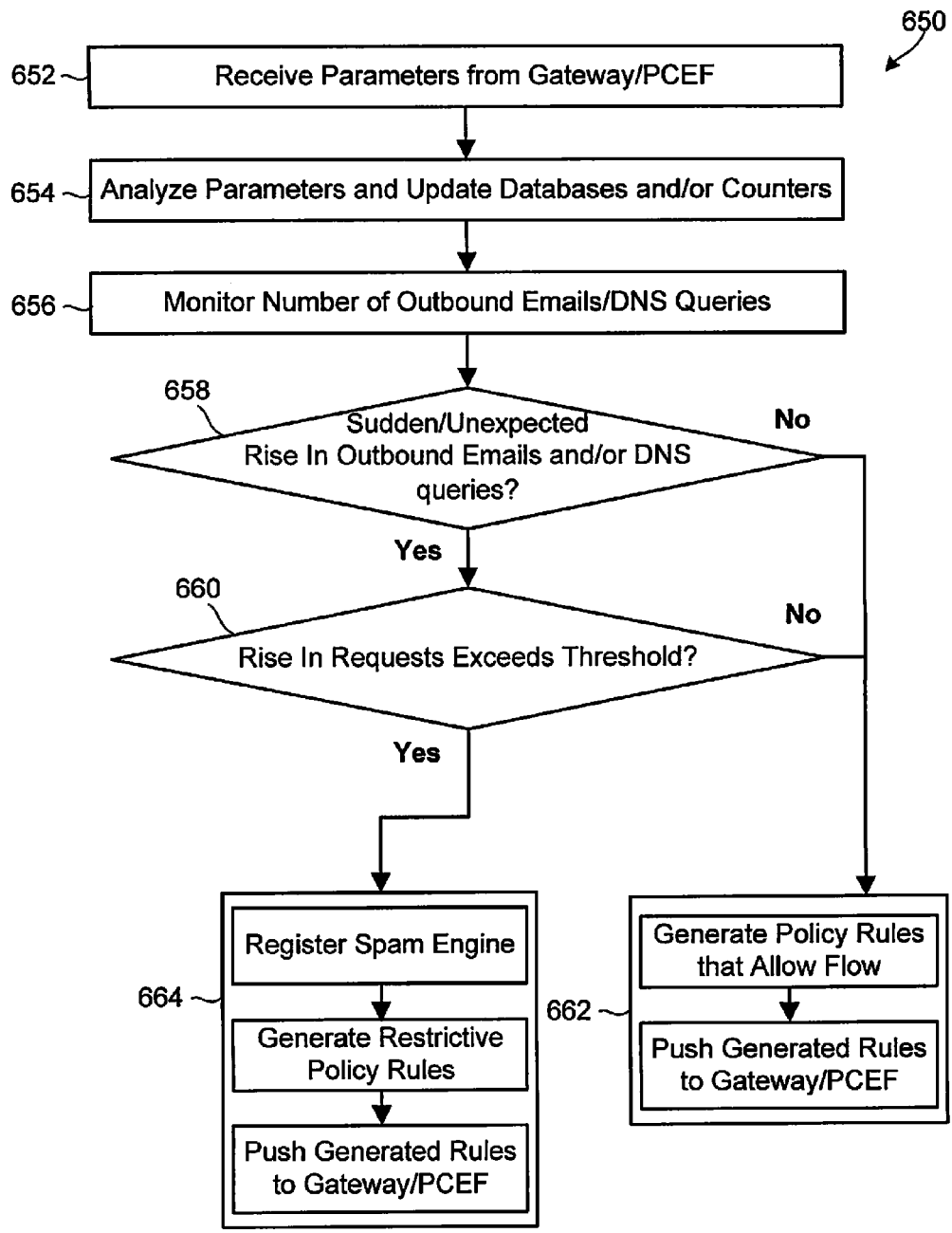

FIGS. 6A-6B illustrate example observed behavior detection methods that may be performed by the policy management system to determine if an IP data flow is a security risk/malware threat. Performing the observed behavior oriented detection methods may include monitoring a number of data flows matching a specific behavior and/or detecting an unexpected rise in a number of requests matching a defined behavior from a specific wireless device. The specific and defined behaviors may include any of the behaviors described below, including unexpected rise in requests, requests to a specific port 80 of a specific IP address, increases in HTTP requests to a specific URL, unexpected rise in requests to a single destination, unexpected rise in outbound emails and/or DNS queries, etc.

FIG. 6A illustrates an example observed behavior detection method 600 for determining if an IP data flow carries content that may contribute to a denial of service attack. In step 602, the policy management system may receive parameters identifying certain key characteristics of the IP data flows and/or network traffic. In step 604, the policy management system may analyze the parameters and update memories, counters and/or threshold values used to monitor sudden and unexpected rises in requests to a single destination. These counters may be used to store running totals, averages, and/or maximum values for one or more different time periods (e.g., the total number of requests to a destination IP address in the last 24 hours, or the average number of requests to a destination IP address per month). Therefore, the counters can be used to store or derive request rates. The counters may be specific to the user, or they may be generalized across groups of users. Therefore, a sudden and unexpected rise in requests to a single destination can be defined in terms of a counter value surpassing a pre-defined rate. This predefined rate can be expressed in terms of the counters (e.g., a sudden and unexpected rise can be defined as the current rate being greater than a tripling of the maximum hourly rate ever experienced). The associated thresholds may be defined as constants, or in terms of the counters (e.g., a threshold can be defined as a quadrupling of the maximum hourly rate ever experienced). Thus, there can be a sudden and unexpected rise in the number of requests to a single destination, but it may not exceed a threshold. In step 606, the policy management system may monitor the number of requests by performing IP level and application level monitoring operations. IP level monitoring operations may include monitoring requests to a specific port 80 of a specific IP address. Application level monitoring operations may include monitoring increases in HTTP requests to a specific URL. In determination step 608, the policy management system may determine if there has been a sudden and unexpected rise in requests to a single destination. This determination may be based upon a counter value surpassing a pre-defined rate, as described previously. If the policy management system determines that there has not been a sudden and unexpected rise in requests to a particular address (i.e., determination step 608="No"), in step 612, the policy management system may generate policy rules and push the generated rules to the gateway/PCEF. If the policy management system determines that there has been a sudden and unexpected rise in requests to a single destination (i.e., determination step 608="Yes"), in determination step 610, the policy management system may determine if the rise in requests exceeds a predetermined threshold. If the rise in requests does not exceed the predetermined threshold (i.e., determination step 610="No"), in step 612, the policy management system may generate policy rules and push the generated rules to the gateway/PCEF. If the rise in requests exceeds the predetermined threshold (i.e., determination step 610="Yes"), the policy management system may conclude that a denial of service attack is emerging, and in step 614, register the destination as being under attack, generate restrictive policy rules to block or limit current and future flows from accessing the registered destination, and push the generated rules to the gateway/PCEF for implementation.

FIG. 6B illustrates an example observed behavior detection method 650 for determining if an IP data flow carries content from spam engines. In step 652, the policy management system may receive parameters identifying certain key characteristics of the IP data flows and/or network traffic from a gateway/PCEF. In step 654, the policy management system may analyze the parameters and update local databases and/or counters with information that may be used to monitor sudden rises in outbound emails and/or sudden rises in domain name system (DNS) queries for mail exchanger (MX) records by a single mobile device. In step 656, the policy management system may monitor the number of outbound emails and/or DNS queries by performing IP-level and application-level monitoring operations. IP-level monitoring operations performed by the policy management system may include monitoring/counting the number of requests by a specific mobile device to port 25 of different IP addresses. Application-level monitoring operations may include monitoring the number of SMTP requests being sent directly to an email recipient's SMTP server from a single mobile device. The IP-level and application-level monitoring operations may be used to identify data flows carrying content originating from a spam engine because "well-behaved" email clients generally send all their outbound email via a single SMTP server, whereas spam engines typically send outbound emails directly to the email recipient's SMTP server.

In determination step 658, the policy management system may determine if there has been a sudden and unexpected rise in outbound emails and/or in domain name system (DNS) queries for mail exchanger (MX) records by a single mobile device. This determination may be based upon a counter value surpassing a pre-defined rate, as described previously. If the policy management system determines that there has not been a sudden and unexpected rise in outbound emails/queries (i.e., determination step 658="No"), in step 662, the policy management system may generate policy rules and push the rules to the gateway/PCEF. If the policy management system determines that there has been a sudden and unexpected rise in outbound emails and/or in domain name system (DNS) queries (i.e., determination step 658="Yes"), in determination step 660, the policy management system may determine if the rise in requests exceeds a predetermined threshold. If the rise exceeds the predetermined threshold (i.e., determination step 660="Yes"), in step 664, the policy management system may identify the data flow as carrying content from a spam engine, register the spam engine (e.g., update a spam engine list in memory, etc.), generate restrictive policy rules to block or limit data flows originating from the spam engine, and push the rules to the gateway/PCEF for enforcement. If the rise does not exceed the predetermined threshold (i.e., determination step 660="No"), in step 664, the policy management system may generate policy rules (e.g., allow, allow with constraints, etc.) and push the rules to the gateway/PCEF.

As mentioned above, the policy management system may perform detection methods (e.g., pattern matching, observed behavior, etc.) and generate restrictive policy rules based on the type of malware detected. For example, the policy management system may generate a "block" rule if an IP data flow carries content having binary-file characteristics of known malware threats (e.g., viruses, Trojan Horses, etc.) and an "allow with constraints" rule if the IP data flow represents a malware threat, but does not contain a binary that is a malware threat (e.g., the IP data flow is part of a denial of service attack, the IP data flow originates from a spam bot, etc.). The "allow with constraints" rule may define requirements (i.e., constraints) for allowing certain IP data flows to pass through the gateway/PCEF. For example, the constraints may require the gateway/PCEF to introduce an artificial latency to certain IP data flows or to set an upper threshold on certain IP data flow rates.

The "allow with constraints" type rules, and the constraints they impose, allow the policy management system to customize each rule to the preferences of a particular subscriber, wireless device type or type value, network component or network client. For example, the policy management system may access user preference parameters that define which constraints are to be used in various situations, as well as the actions, conditions and variables (e.g., risk levels, thresholds, data usage levels, costs, etc.) associated with each constraint. In an embodiment, a unique/separate set of user preference parameters may be maintained for each wireless subscriber, device, device type, network component, or client. In this manner telecommunications network operators and their customers may customize responses to malware events, which may be implemented automatically and in real time, consistent with the type of threat and how the network operator and/or customer prefers to respond. For example, some organizations cannot to afford to shut off all requests for service during a denial of service attack, and thus would prefer constraints on the volume or data rates imposed on incoming service requests.

In an embodiment, the constraints imposed by the policy management system may be proportional to a malware threat or threat-level as determined by the malware protection system or specified by an operator. Methods for determining a malware threat-level within malware protection system are disclosed herein. In an embodiment, the constraints imposed by the policy management system may become progressively more restrictive or constrained, in real-time, as a malware threat or threat-level rises as determined by malware protection system, an operator or other systems configured to identify the threat level.

User preference parameters may define the actions and conditions associated with each constraint in "allow with constraints" type rules. Thus, the user preference parameters may be used by the policy management system to generate policy rules that instruct the gateway/PCEF to perform several different types of operations (i.e., actions) as well as set conditions for performing those actions. For example, the policy management system may access the user preference parameters to determine that the correct course of action (i.e., the correct rule) for the gateway/PCEF upon the detection of low-risk malware is to send an alert message to the wireless device without blocking the IP data flow. Likewise, the user preference parameters may be used by the policy management system to generate rules that instruct the gateway/PCEF to block the current IP data flow and all future IP data flows until the malware has been manually removed from the mobile device.

In an embodiment, the policy management system may perform quarantining operations by storing details of IP data flows, aggregated details of the IP data flows, or sequestering the actual content of the IP data flows, that were allowed, constrained, or blocked. The policy management system may store source information, destination information and time information for each IP data flow that is constrained. For example, the policy management system may track the number of IP data flows containing infected binaries within a predetermined time period (e.g., within the last month) and store the number value in a memory. The policy management system may also store emails deemed to be spam. This information may be stored such that a wireless device user whose mobile device is associated with these IP data flows may subsequently view the quarantining details. In an embodiment, the policy management system may be configured to receive messages from the wireless device user that trigger further quarantining actions (e.g., removing a stored IP data flow, un-quarantining stored IP data flow, etc.). For example, the user may send the policy management system a message to reclassify an email as not spam, in which case the email may be pushed to the mobile device by the policy management system. In an embodiment, the user may classify the IP data flow in a manner that causes the policy management system to allow delivery of future similar IP data flows.

In the various embodiments, user preference parameters may be generated from information from a subscriber account in the user repository, by interacting with the user (e.g., via SMS messages sent through the notification server 126, etc.) to determine his/her preferences in real-time, by using contextual information (e.g., roaming in third party network, home network, etc.), or any combination thereof. For example, a wireless device user may upload user preference parameters to the user repository that instructs the policy management system to send an alert to the user's wireless device warning of potential risks if the wireless device is not roaming in a third-party mobile data network and to block the current IP data flow and all future IP data flows if the wireless device is roaming in a third-party mobile data network. In this manner, cost conscientious users may prevent a potential malware program from accessing online services while roaming in an expensive third-party mobile data network.

In an embodiment, the user preference parameters may be based on a malware threat model. The malware threat model may be defined in terms of multiple independent factors, such as the probability of infection, the type of infection, the severity of the threat posed by the infection, and the difficulty associated with removing the infection. These factors may be weighted and combined to produce an overall threat level. The user may then specify his/her preference in terms of this overall threat level. Alternatively, the user may specify his/her preference in terms of one of the factors within the threat model (e.g., a user may be willing to be exposed to a type of infection that installs Adware, whereas he/she may not be willing to be exposed to a type of infection that corrupts or destroys data stored on the wireless device).

In an embodiment, the policy management system and/or gateway/PCEF may be configured to charge users/subscribers differently for the IP data flows depending on the actions. For example, a user/subscriber may not be charged for any IP data flows that were blocked by the gateway.

In an embodiment, a malware prevention and removal client (MPRC) software application may be pushed to the wireless devices. The policy management system may, upon determining that an IP data flow is associated with a malware threat, notify the malware protection system of the wireless device's identity and the detected malware. The malware protection system may then update, or instruct, the MPRC to take preventative, recovery, or removal actions specific to the wireless device type or type value and the detected malware threat. For example, the malware protection system may instruct the MPRC to disable the wireless device's data capabilities and/or isolate the mobile device from the mobile data network until the malware is removed or is otherwise no longer a threat. In an embodiment, the policy management system may send a notification based on the status of the user's subscription to the malware prevention service.

As discussed above with reference to FIG. 3, the policy management system may exchange information with both a user repository and a charging system. In an embodiment, the policy management system may directly charge the subscription accounts of beneficiaries (e.g., wireless device users, web servers, telecommunication clients, etc.) of the above mentioned malware detection/prevention services by sending a charging message to deduct funds from each subscriber's service account. For example, the policy management system may send a charge message to charge a wireless device user's wireless subscription account each time malware is detected and/or removed from the user's wireless device.

The policy management system may support multiple different charging models to support any required business models. The charging models may include providing the above mentioned services free-of-charge, charging on an annual basis, on a pay-as-you-consume basis, or any combination thereof. If the services are charged on an annual basis, the policy management system may determine the status of the users' annual subscriptions (e.g., last time payment was made, account status, subscription level, etc.) by accessing the user repository and sending charging messages to the charging system to charge the customers as required. If the services are charged on a pay-as-you-consume basis, the policy management system may send a charging request to the charging system each time the service is provided (e.g., each time a message is send waning of potential malware). In an embodiment, each service may be charged separately. For example, the policy management system may send charging messages to the charging system annually for the detection services and send charging messages to the charging system each time malware is removed.

In an embodiment, the policy management system may be configured to automatically adapt to a network wide stance if the detection of malware indicates that the network is under attack. The adaption of the network wide stance may be in stages, such that the network-wide protections are progressive. In an embodiment, the policy management system may change and/or bulk push policies/rules into the network if the network the detection of malware indicates that the network is under attack. Policies/rules may be pushed to network elements upon detection of a new malware threat or upon a malware threat level achieving a predefined threshold such that the network adopts an "under attack" pre-defined configuration. The initiation of such "under attack" responses or configuration may be based on the detection of malware and/or policy counters exceeding a predefined threshold number or instances of attack.

Figure 7:
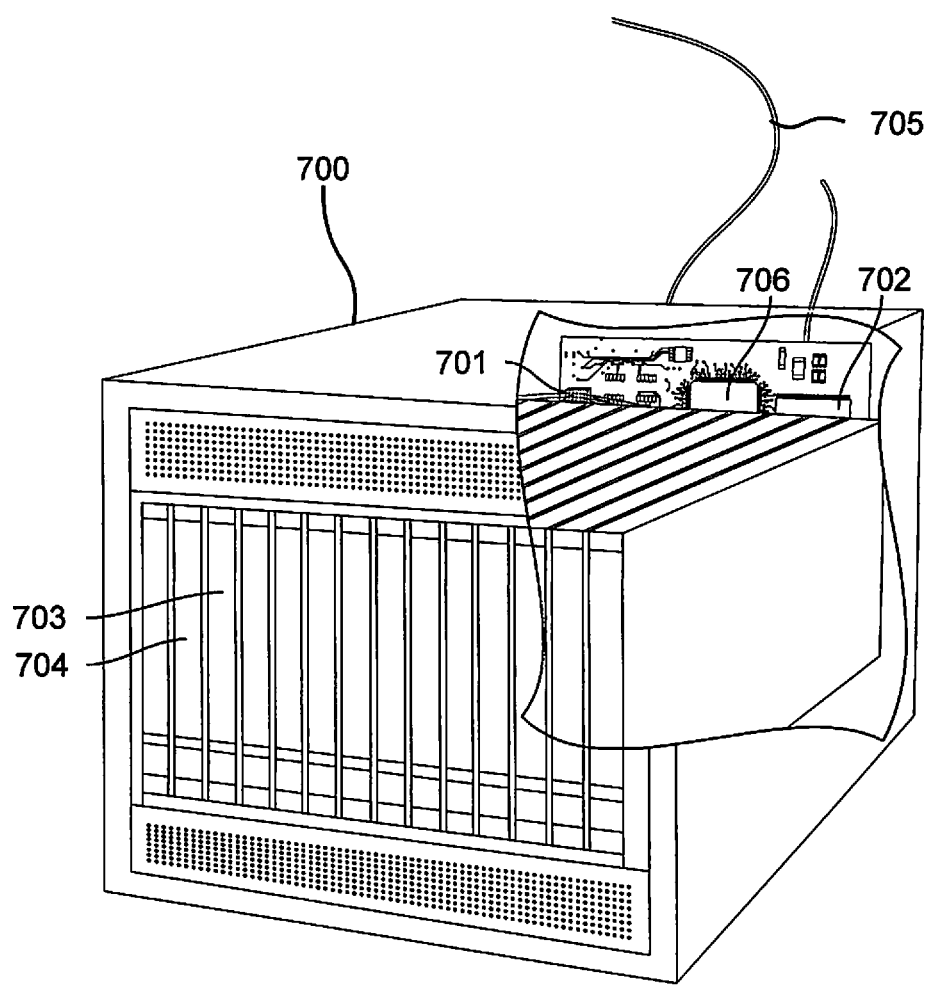
FIG. 7 is a component block diagram of a server suitable for use with an embodiment.

The various embodiments and logical components may be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 703. The server 700 may also include a floppy disc drive, compact disc (CD) or DVD disc drive 706 coupled to the processor 701. The server 700 may also include network access ports 704 coupled to the processor 701 for establishing data connections with a network 705, such as a local area network coupled to other broadcast system computers and servers.

The processor 701 may be any programmable microprocessor, microcomputer or multiple processor chip or chips that can be configured by software instructions (applications) to perform a variety of functions, including the functions of the various embodiments described below. Multiple processors 701 may be provided, such as one processor dedicated to wireless communication functions and one processor dedicated to running other applications. Typically, software applications may be stored in the internal memory 702, 703 before they are accessed and loaded into the processor 701. The processor 701 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable medium. The steps of a method or algorithm disclosed herein may be embodied in a processor-executable software module which may reside on a non-transitory computer-readable storage medium. Non-transitory computer-readable storage media may be any available media that may be accessed by a computer (e.g., a server) or processor of a computer or server. By way of example, and not limitation, non-transitory computer-readable media may include RAM, ROM, EEPROM, CD-ROM or other optical disk storage, magnetic disk storage or other magnetic storage devices, or any other storage medium that may be used to store desired program code in the form of processor-executable instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A communication method, comprising:
   receiving in a server outside of a first and a second telecommunication network from one or more communication system control network components in the first telecommunication network data flow parameters identifying characteristics of a first data flow;
   performing in the server a detection method to determine whether the first data flow carries malicious content;
   sending security information generated from the performance of the detection method to a policy server in the second telecommunication network;
   receiving the security information in the policy server;
   querying a charging system to receive charging information related to a second data flow in the policy server;
   determining in the policy server whether the second data flow carries malicious content based on the security information received from the server and the charging information received from the charging system;
   generating in the policy server restrictive policy rules in response to determining from the security information received from the server and the charging information received from the charging system that the second data flow carries malicious content;
   generating in the policy server non-restrictive policy rules in response to determining from the security information received from the server and the charging information received from the charging system that the second data flow does not carry malicious content; and
   pushing the generated policy rules to a communication system gateway configured to control the second data flow between a wireless device and an external network.

2. The method of claim 1, wherein generating in the policy server restrictive policy rules in response to determining from the security information received from the server and the charging information received from the charging system that the second data flow carries malicious content comprises:
   generating restrictive policy rules based on a subscriber's usage history and a subscription level.

3. The method of claim 1, wherein generating in the policy server restrictive policy rules in response to determining from the security information received from the server and the charging information received from the charging system that the second data flow carries malicious content comprises:
   generating constraints that are proportional to a threat-level associated with the malicious content; and
   generating restrictive policy rules that impose the generated constraints on the communication system gateway.

4. The method of claim 1, further comprising transmitting malware detection feedback to a network component in a second external network.

5. The method of claim 1, further comprising interacting with a wireless device user to determine user preferences in real-time via alert messages sent through a notification server to receive user preference parameters.

6. The method of claim 1, wherein the second data flow originates from the wireless device, and generating in the policy server restrictive policy rules in response to determining from the security information received from the server and the charging information received from the charging system that the data flow carries malicious content comprises:
 generating restrictive policy rules that instruct the communication system gateway to block future data flows originating from the wireless device.

7. The method of claim 1, wherein performing in the server a detection method to determine whether the first data flow carries malicious content comprises performing in the server a pattern matching detection method.

8. The method of claim 7, wherein:
 receiving in the server data flow parameters identifying characteristics of the first data flow comprises receiving parameters identifying binary-file characteristic information; and
 performing in the server the pattern matching detection method comprises comparing the identified binary-file characteristic information with a binary-file characteristic of a known malware type to determine whether the first data flow carries content having binary-file characteristics of known malware.

9. The method of claim 7, wherein:
 receiving in the server data flow parameters identifying characteristics of the first data flow comprises receiving parameters identifying source and destination information; and
 performing in the server the pattern matching detection method comprises comparing the identified source and destination information against a list of known offender sources and destinations to determine whether the first data flow originates from a wireless device known to engage in malicious activity and whether the first data flow is destined for a website/server known to engage in malicious activities.

10. The method of claim 7, wherein:
 receiving in the server data flow parameters identifying characteristics of the first data flow comprises receiving parameters identifying destination information; and
 performing in the server the pattern matching detection method comprises comparing the identified destination information against a list of destinations known to be under attack to determine whether a destination of the first data flow is a network server under attack.

11. The method of claim 7, wherein:
 receiving in the server data flow parameters identifying characteristics of the first data flow comprises receiving parameters identifying messaging information; and
 performing in the server the pattern matching detection method comprises comparing the identified messaging information with spam heuristics.

12. The method of claim 1, wherein performing in the server the detection method to determine whether the first data flow carries malicious content comprises performing a behavior oriented detection method.

13. The method of claim 12, wherein performing the behavior oriented detection method comprises accessing information stored in a user repository of a control network.

14. The method of claim 12, wherein performing the behavior oriented detection method comprises accessing information stored in a second charging system.

15. The method of claim 12, wherein performing the behavior oriented detection method comprises updating a counter value to monitor a number of data flows matching a specific behavior.

16. The method of claim 12, wherein performing the behavior oriented detection method comprises performing monitoring operations in order to detect an unexpected rise in a number of requests matching a defined behavior from a specific wireless device.

17. A system, comprising:
 a server outside of a first telecommunication network and a second telecommunication network;
 a communication system control network component inside the first telecommunication network; and
 a policy server in the second telecommunication network, wherein:
 the server comprises:
  a server memory; and
  a server processor coupled to the server memory, wherein the server processor is configured with processor-executable instructions to perform operations comprising:
   receiving data flow parameters identifying characteristics of a first data flow from the communication system control network component;
   performing a detection method to determine whether the first data flow carries malicious content; and
   sending security information generated from the performance of the detection method to the policy server, and
 the policy server comprises a processor configured with processor-executable instruction to perform operations comprising:
  receiving the security information;
  querying a charging system to receive charging information related to a second data flow;
  determining whether the second data flow carries malicious content based on the security information received from the server and the charging information received from the charging system;
  generating restrictive policy rules in response to determining from the security information received from the server and the charging information received from the charging system that the second data flow carries malicious content;
  generating non-restrictive policy rules in response to determining from the security information received from the server and the charging information received from the charging system that the second data flow does not carry malicious content; and
  pushing the generated policy rules to a communication system gateway configured to control the second data flow between a wireless device and an external network.

18. The system of claim 17, wherein the processor of the policy server is configured with processor-executable instructions to perform operations further comprising:
 transmitting malware detection feedback to the server.

* * * * *